US007971062B1

(12) United States Patent
Hughes et al.

(10) Patent No.: US 7,971,062 B1
(45) Date of Patent: Jun. 28, 2011

(54) TOKEN-BASED ENCRYPTION KEY SECURE CONVEYANCE

(75) Inventors: James P. Hughes, Herndon, VA (US);
Alexander Stewart, Louisville, CO (US); Dwayne A. Edling, Longmont, CO (US)

(73) Assignee: Oracle America, Inc., Redwood City, CA (US)

( * ) Notice: Subject to any disclaimer, the term of this patent is extended or adjusted under 35 U.S.C. 154(b) by 1135 days.

(21) Appl. No.: 11/403,109

(22) Filed: Apr. 12, 2006

(51) Int. Cl.
*H04L 9/32* (2006.01)
*H04L 9/08* (2006.01)

(52) U.S. Cl. .............. 713/172; 380/278; 726/20; 726/9

(58) Field of Classification Search ............... 726/9, 20; 380/45, 278; 713/172
See application file for complete search history.

(56) References Cited

U.S. PATENT DOCUMENTS

| | | | |
|---|---|---|---|
| 5,208,853 A | 5/1993 | Armbruster et al. | |
| 5,313,521 A | 5/1994 | Torii et al. | |
| 5,604,801 A * | 2/1997 | Dolan et al. | 713/159 |
| 5,623,546 A * | 4/1997 | Hardy et al. | 713/193 |
| 5,745,571 A | 4/1998 | Zuk | |
| 6,134,237 A | 10/2000 | Brailean et al. | |
| 6,351,813 B1 * | 2/2002 | Mooney et al. | 713/185 |
| 6,363,423 B1 | 3/2002 | Chiles et al. | |
| 6,708,272 B1 * | 3/2004 | McCown et al. | 713/151 |
| 6,934,839 B1 | 8/2005 | Pagel | |
| 6,957,330 B1 | 10/2005 | Hughes | |
| 7,023,801 B1 | 4/2006 | Hollins | |
| 7,062,045 B2 | 6/2006 | Riddick et al. | |
| 7,420,596 B2 * | 9/2008 | Niimura | 348/231.3 |
| 2003/0182565 A1 | 9/2003 | Nakano et al. | |
| 2003/0196106 A1 | 10/2003 | Erfani et al. | |
| 2004/0083091 A1 * | 4/2004 | Ie et al. | 704/9 |
| 2004/0103292 A1 * | 5/2004 | Shirouzu | 713/193 |
| 2004/0125782 A1 * | 7/2004 | Chang | 370/338 |
| 2004/0208316 A1 * | 10/2004 | Wack et al. | 380/44 |
| 2005/0021941 A1 * | 1/2005 | Ohmori et al. | 713/156 |
| 2005/0108560 A1 * | 5/2005 | Han et al. | 713/193 |
| 2005/0246553 A1 | 11/2005 | Nakamura et al. | |

OTHER PUBLICATIONS

"Applied Cryptography", Second Edition, 1996, Bruce Schneier.*
Final Office Action for U.S. Appl. No. 11/516,885 mailed Mar. 17, 2010.
Schneier, "Applied Cryptography," 1996, Wiley and Sons, 2nd Edition, 75-76, 183-184, 167-177, 357.
TRA "Understanding IP Network Security," 2005, TRA.
Office Action for U.S. Appl. No. 11/516,885 mailed Sep. 2, 2009.
Office Action for U.S. Appl. No. 11/516,885 mailed Aug. 31, 2010.
Office Action for U.S. Appl. No. 11/516,885 dated Feb. 15, 2011.
Bruce Schneier, Applied Cryptography, 1996, pp. 28-34 and 367-368.

* cited by examiner

*Primary Examiner* — Taghi T Arani
*Assistant Examiner* — Mohammad L Rahman
(74) *Attorney, Agent, or Firm* — Brooks Kushman P.C.

(57) ABSTRACT

A hand-held token for secure conveyance of encryption keys includes memory for holding a media key and at least one device key. Control logic reads the media key from memory, encrypts the media key based on the device key, and transmits the encrypted media key to a data storage device. The data storage device decrypts the encrypted media key using its own device key, which may have previously been downloaded from a token.

14 Claims, 4 Drawing Sheets

TOKEN-BASED ENCRYPTION KEY SECURE CONVEYANCE

BACKGROUND OF THE INVENTION

1. Field of the Invention

The present invention relates to encrypting data held by data storage devices.

2. Background Art

Protecting data from unauthorized access is becoming increasingly important. Both the amount and kinds of data generated and requiring protection continue to increase. Moreover, attacks by those not authorized to access the data grow in frequency and sophistication. An emerging need is for the encryption of data held in storage devices, referred to as "at-rest data encryption."

Encryption is accomplished through the use of encryption keys. Depending upon the encryption process used, possession of one or more keys allows encrypted data to be decrypted. For simplicity, the term encrypt (or its variants) will be used to refer to any aspect of the encryption process, including decrypting. Care must be taken to ensure that such encryption keys are only provided to systems and/or users with the proper authority.

Other than in very simple encryption implementations which may use fixed keys in each storage device, a practical implementation of an encryption data storage system may involve multiple storage devices whose encryption keys are assigned and controlled by a user through some form of key management equipment and process, such as a key management station. For increased security, key management stations are typically physically separate from data storage networks and storage devices. This raises the problem of how to convey keys from the Key Management Station to the encrypting device in a convenient manner that prohibits or reduces the chance of an attacker intercepting and reading the transaction.

One method for conveying keys is to write the keys onto smart cards. This method has several disadvantages, including limited ability to provide on-board encryption processing, limited or no ability to indicate status, and probability of loss or theft due to small size and storage medium.

What is needed are improved techniques for conveying encryption keys and other information between key management equipment and encrypting data storage devices.

SUMMARY OF THE INVENTION

The present invention provides a hand-held token for secure conveyance of encryption keys.

Many types of encryption keys may be used. For example, media keys are used to encrypt user data in an encrypting data storage devices. As another example, device keys are used to encrypt and obscure media keys when they are being transmitted or held in storage in the token or in the encrypting data storage device.

A token for the secure conveyance of at least one media key is provided. Each media key is used for encrypting data in a data storage device. The token includes memory for holding the media key and at least one device key, a communication interface, and control logic. The control logic reads the media key from memory, encrypts the media key based on the device key, and transmits the encrypted media key to the data storage device through the communication interface.

In an embodiment of the present invention, the control logic is operative to delete at least one of the media key and the device key following user activation of a user input.

In another embodiment of the present invention, the control logic receives status information about the data storage device through the communication interface and stores the received status information in memory.

In yet another embodiment of the present invention, the control logic encrypts the media key based on a nonce generated within the token. The control logic may change the nonce so that the nonce value is unique each time the media key is encrypted.

In still other embodiments of the present invention, the token may include various indicators. For example, the control logic may activate a communication indicator in response to communication activity through the communication interface. The control logic may also activate at least one status indicator in response to a change in status of the token.

A method of securely transmitting at least one media key to a data storage device is also provided. A first device key is loaded from a first token into the data storage device. The media key is encrypted using a second device key. The encrypted media key is stored in a second token. The second token is interconnected with the data storage device and the encrypted media key is transmitted from the second token to the data storage device. The encrypted media key is decrypted in the data storage device using the first device key. The first token and the second token may be the same token or different tokens.

In an embodiment of the present invention, the first device key is a first copy of at least one symmetric encryption key and the second device key is a second copy of the at least one symmetric encryption key.

In another embodiment of the present invention, the second token encrypts the media key using the second device key.

In still another embodiment of the present invention, the second token deletes at least one of the second device key and the at least one media key in response to user input received by the token.

In a further embodiment of the present invention, status information is sent from the data storage device to the token.

A system for storing encrypted data on data storage media is also provided. The system includes a plurality of data storage devices, each writing encrypted data onto the data storage media. Each data storage device stores at least one first device key for decrypting at least one media key used to encrypt the encrypted data. A first communication network interconnects the data storage devices with at least one host computer, allowing data to be transmitted between the each host computer and the data storage devices. A second communication network, separate from the first communication network, interconnects the data storage devices. A token may be removably connected to the second communication network. The token may store at least one second device key corresponding to the at least one first device key for at least one data storage device. The token may also store at least one media key. The token can encrypt the media key using the second device key and transmit the encrypted media key to at least one data storage device.

In an embodiment of the present invention, the data storage device erases the media keys if power is removed.

In another embodiment of the present invention, the data storage device sends status information to the token through the second communication network.

In yet another embodiment of the present invention, the data storage device receives the first device key by a direct connection to the token without using the second communication network.

The various objects, features, and advantages of the present invention are readily apparent from this specification includ-

DETAILED DESCRIPTION OF THE PREFERRED EMBODIMENT(S)

Figure 1:
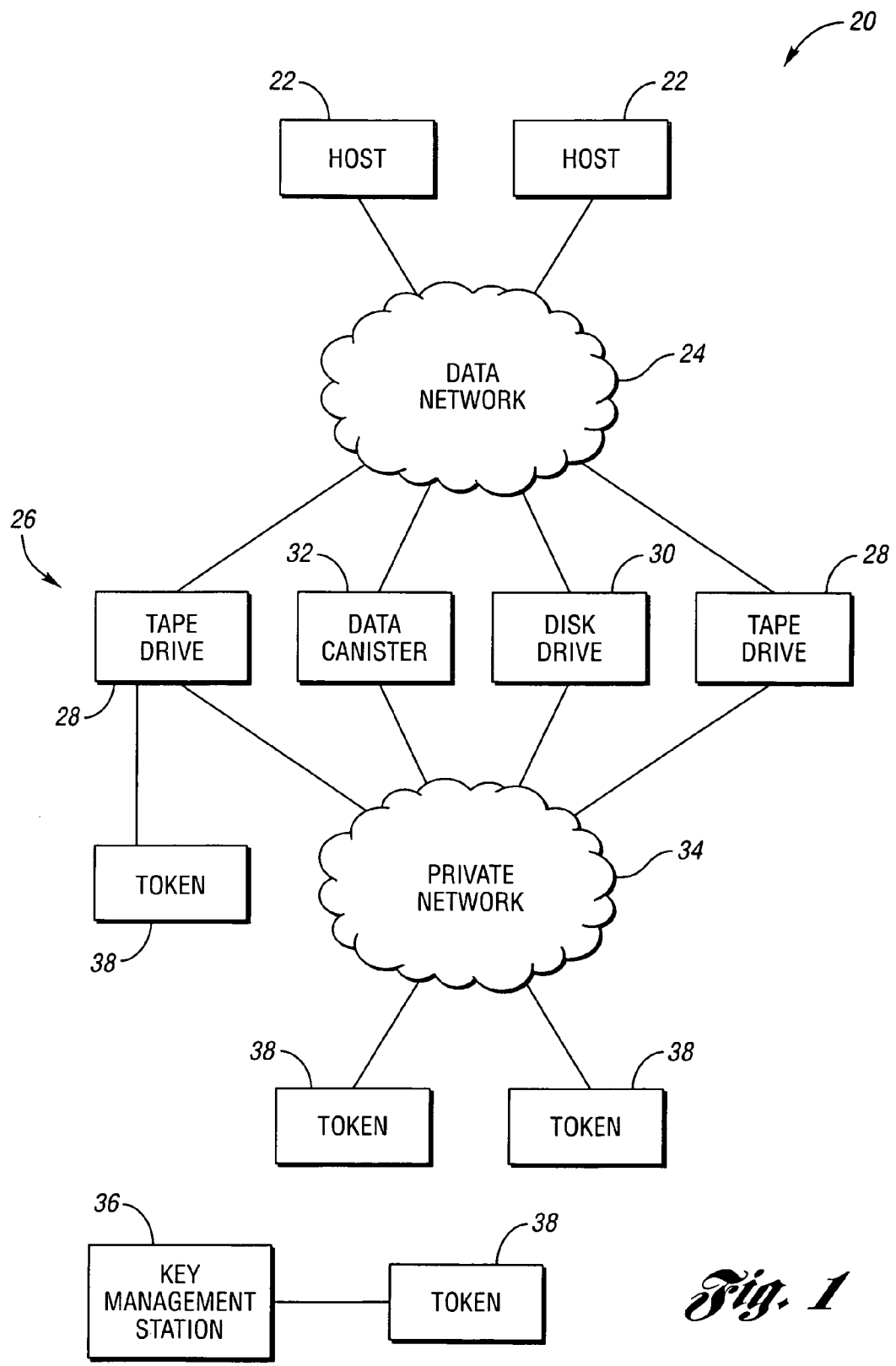
FIG. 1 is a block diagram of an encryption system according to an embodiment of the present invention.

Referring to FIG. 1, a block diagram of an encryption system according to an embodiment of the present invention is shown. A data encryption system, shown generally by 20, typically includes one or more data producers and/or consumers such as host computers 22. Data network 24 interconnects host computers 22 with a plurality of storage devices, shown generally be 26. Storage devices 26 include encryption logic for encrypting data based on media keys. Any type of storage device 26 may be used with the present invention including tape drive 28, disk drive 30, and data canister 32. Tape drive 28 accepts removable optical or magnetic cartridges or cassettes. Disk drive 30 may use hard or flexible optical or magnetic disks that may be removable or may be fixedly enclosed in disk drive 30. Data canisters 32 include a wide variety of storage devices such as collections of one or more disk drives, tape drives, solid state memory, magnetic bubble memory, holographic memory, microelectromechanical system (MEMS) storage devices, and the like. Storage devices 26 may be removable in the sense that they may be disconnected from data network 24. The ability to remove storage devices 26 may be intentionally designed into data encryption system 20 such as, for example, in the case of hot-swappable drives or pluggable data canisters. However, removability also encompasses the possibility that otherwise permanently affixed storage devices 26 may be removed by unauthorized personnel attempting to misappropriate storage device 26 or the data held therein.

In the embodiment illustrated in FIG. 1, storage devices 26 are interconnected through private network 34 separate from data network 24. Private network 34 may be used to exchange information about the operation of storage devices 26, although for security reasons this private network may be used exclusively for key transactions. Private network 34 is primarily used to distribute encryption keys to storage devices 26. In the absence of, or together with, private network 34, storage devices 26 may include a separate connection for loading encryption keys or the same connection may be used alternatively for a direct connection instead of a networked connection. In an alternative embodiment, data network 24 may be used to distribute some or all of encryption keys.

Encryption keys are created, assigned, revoked, and otherwise managed through key management station 36. To preserve security, key management station 36 is not directly connected to either data network 24 or private network 34. Instead, keys are delivered from key management station 36 using one or more tokens 38.

Tokens 38 perform a dual role. Enabling tokens are used to transfer one or more device keys from key management station 36 into data storage devices 26. Operational tokens are used to transfer media keys from key management station 36 into data storage devices. Media keys are used by the data storage devices to encrypt data. Device keys are used by the data storage devices to decrypt media keys. Preferably, any token 38 may function as either an enabling token or an operational token, but not both token types simultaneously. Alternatively, different tokens 38 may be used for operational tokens than for enabling tokens. Preferably, tokens 38 may deliver keys by directly connecting to a particular data storage device 26 or by sending keys through private network 34. The latter option is preferred for delivering media keys as one token 38 may be accessed through private network 34 by a plurality of data storage devices 26.

In an embodiment of the present invention, a "device key" includes three different keys. A wrap key (Wkey) is used to encrypt media keys in key management station 36. A split key (DSkey) is used by key management station 26 to further obscure the media key by an exclusive-or operation. A communication key (OCkey) is used by operational token 38 to provide a further level of encryption on keys transmitted to data storage device 26. Data storage device 26 must have a corresponding wrap key, split key, and communication key to decrypt the media keys provided by token 38. In a preferred embodiment, device keys are symmetrical. However, asymmetrical keys may also be used.

When operating as an enabling token, token 38 receives a wrap key, split key, and communication key from key management station 36. These key values may be encrypted by key management station 36 using a prior value of one of the device keys so that the new key values are not exposed in plain text while stored in the token memory. Token 38 is then preferably hand-carried to target data storage device 28. The device key is then downloaded from enabling token 38 into data storage device 26. Status information regarding success of device key loading may be sent from data storage device 26 to token 38. Token 38 may then be hand-carried back to key management station 36 for uploading of status information. In an embodiment, the device key may be deleted from token 38 upon loading into data storage device 28 or by key management station 36.

Key management station 36 assigns one or more values for a media key (MKey) for use by a data storage device 26 to encrypt data. Key management station 36 performs an exclusive-or operation on the media key using the split key, then encrypts the result using the wrap key. This value, Wkey{DSkey⊕MKey}, is then loaded by key management station 36 into token 38 functioning as an operational token. Operational token 38 further encrypts this value using the communication key to form an encrypted media key, OCKey{Wkey{DSkey⊕MKey}}. The value of the communication key used by token 38 for encryption may be stored in plain text in token memory so that it is available to the token process for use as an encryption key. Preferably, operational token 38 holds a plurality of encrypted media keys.

Operational token 38 is then hand-carried from key management station 36 to an input port on private network 34. When needed, operational token 38 transfers one or more encrypted media keys over private network 34 to data storage device 26. Data storage device 26 uses previously loaded split key, wrap key, and communication key to recover the one or more media keys. Data storage device 26 uses the media key(s) to encrypt data sent over data network 24.

At no time is token 38 carrying sufficient information to decrypt actual data or to provide an unencrypted key value that could be used to decrypt data. When functioning as an enabling token, token 38 is not carrying any media keys necessary for decrypting data. When functioning as an operational token, token 38 does not carry either the split key or the wrap key necessary for decrypting the media key(s).

Figure 2:
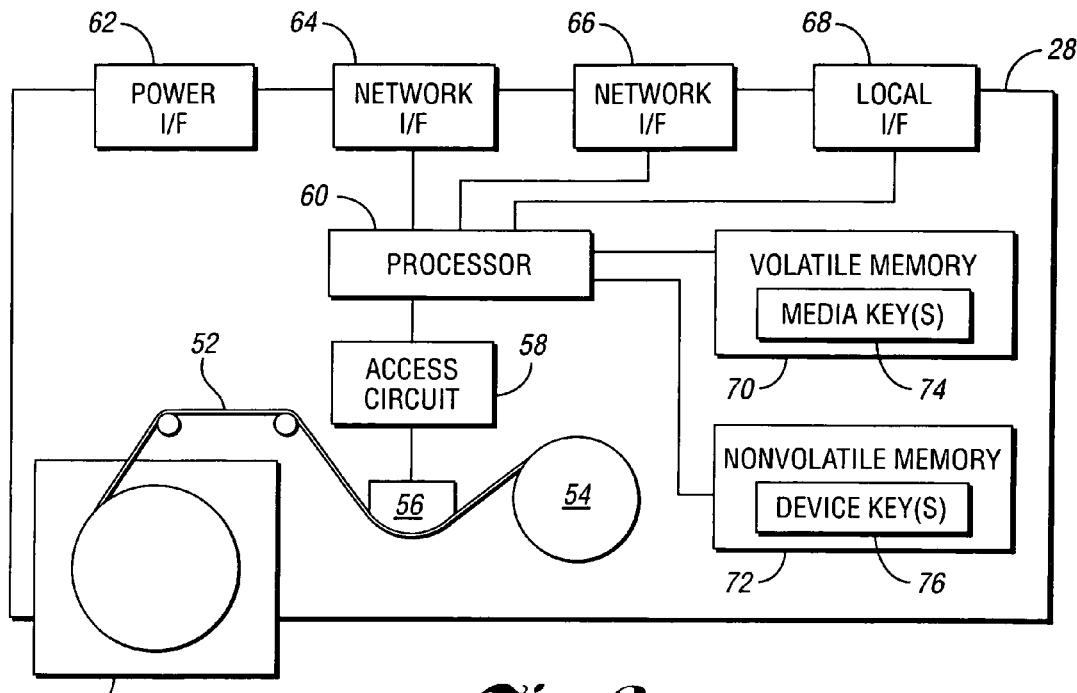
FIG. 2 is a block diagram of a data storage device according to an embodiment of the present invention.

Referring now to FIG. 2, a block diagram of a data storage device according to an embodiment of the present invention is shown. Tape drive 28 accepts tape cartridge 50 containing magnetic data tape 52 which is pulled by take-up reel 54 past write head 56. Access circuit 58 drives write head 56 based on write data provided by processor 60.

Tape drive 28 includes a number of interfaces. Power interface 62 provides electrical energy for powering the elements of tape drive 28 through connections omitted for clarity. Network interface 64 allows tape drive 28 to interconnect with data network 34. Data to be encrypted by tape drive 28 is received through network interface 64. Network interface 66 connects tape drive 28 with private network 44. Encryption keys may be loaded into tape drive 28 through network interface 66. Encryption keys may also be loaded into tape drive 28 directly from token 38 connected through local interface 68. Network interfaces 64, 66 may support any kind of network including Ethernet, Fibre Channel, and the like. Local interface 68 may support network connections such as Ethernet and Fibre Channel or may support other connections such as Fire Wire, USB, and the like.

Tape drive 28 includes volatile memory 70 and non-volatile memory 72 accessible by processor 60. One or more media keys 74 are stored in volatile memory 70 so that if power interface 62 is disconnected, media keys 74 will be deleted from tape drive 28. Device key 76, which may include one or more encryption keys for tape drive 28, is stored in non-volatile memory 72.

Figure 3:
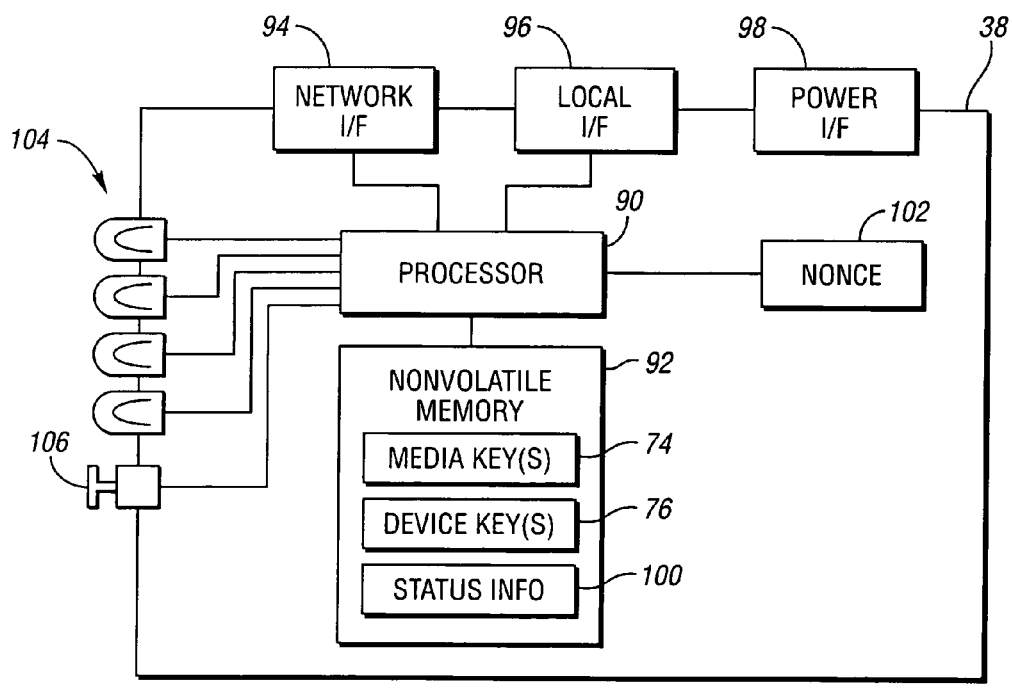
FIG. 3 is a block diagram of a token according to an embodiment of the present invention.

Referring now to FIG. 3, a block diagram of a token according to an embodiment of the present invention is shown. Token 38 includes processor 90 providing access to nonvolatile memory 92 through at least one interface such as network interface 94 and local interface 96. Network interface 94 may support any kind of network including Ethernet, Fibre Channel, and the like, and may permit token 38 to be connected to a private network. Local interface 96 may support network connections such as Ethernet and Fibre Channel or may support other connections such as Fire Wire, USB, and the like, and may permit token 38 to be directly connected to a key management station and/or a data storage device. Network interface 94 may be the same as local interface 96, may be separate from local interface 96, or token 38 may have only one type of communication interface 94, 96.

Token 38 also includes power interface 98 for supplying power to elements within token 38 through connections not shown for clarity. In one embodiment, token 38 is only powered-up when connected to another device, such as a key management station, network, or data storage device. For convenience, power interface 98 may be part of network interface 94 or local interface 96 such as, for example, through a powered USB port or power-over-Ethernet port as is known in the art.

When functioning as an enabling token, processor 90 loads one or more device keys 76 into nonvolatile memory 92 from interface 94,96 for later transmission to a data storage device through interface 94,96. Processor 90 may also receive status information 100 from the data storage device through interface 94,96 and write status information 100 into nonvolatile memory 92. When functioning as an operational token, processor 90 may include one or more device keys 76 as well as one or more media keys 74 in nonvolatile memory 92. Processor 90 may encrypt each media key 74 with device key(s) 76. This encryption process may include nonce 102, which is unique for each encryption. Nonce 102 may be created within processor 90, kept in a dedicated hardware counter, stored in nonvolatile memory 92 or volatile memory (not shown), any combination of these, or the like. Encrypted media key(s) 74 are sent to a data storage device by processor 90 through communication interface 94,96. Status information 100 from the data storage device may be written by processor 90 into nonvolatile memory 92.

Token 38 may include one or more indicators, such as light emitting diodes, shown generally by 104. Any other form of indication, such as ad LED screen display, LCD display, or the like, may also be used. Processor 90 controls indicators 104 to indicate the operational status of token 38. For example, an amber indicator may indicate network connectivity and a green indicator may indicate network activity. A number of green indicators may be used to indicate status such as whether or not token 38 is functioning as an enabling token, whether or not token 38 is functioning as an operational token, the progress of key transfer, whether or not status information 100 is present, whether or not token 38 may be safely disconnected, and the like. A red indicator may be used to indicate token 38 is in a failure mode.

Token 38 may include user input 106, such as a push button. User input 106 may be used to clear some or all the contents of nonvolatile memory 92. Input 106 may be activated, for example, by a user to prevent media keys and/or device keys from being taken by an unauthorized person. The design of the token hardware may be such as to physically protect the push button such as, for example, by recessing it, so that the possibility of inadvertent actuation is reduced.

Figure 4:
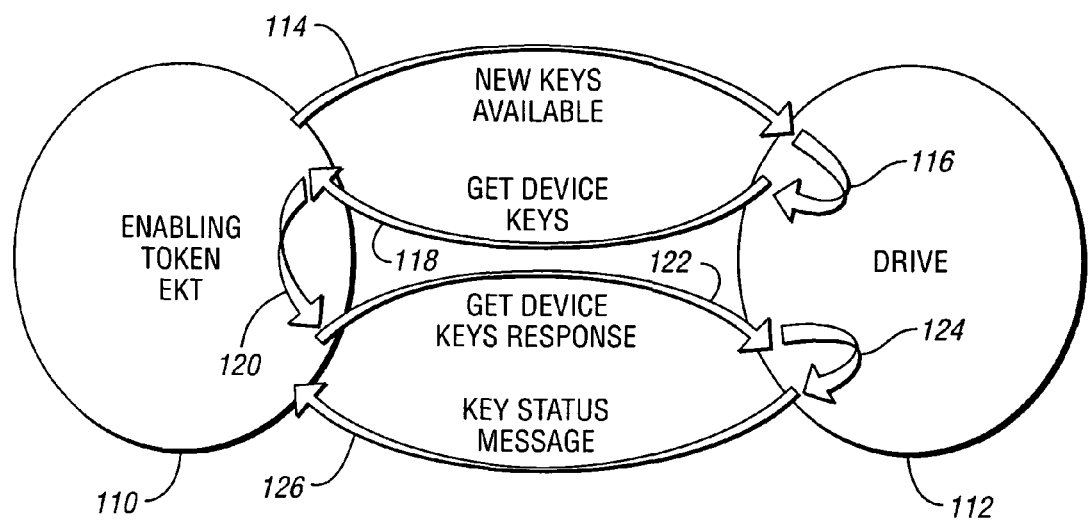
FIG. 4 is a flow diagram illustrating exchange between an enabling token and a data storage device according to an embodiment of the present invention.

Referring now to FIG. 4, a flow diagram illustrating exchange between an enabling token and a data storage device according to an embodiment of the present invention is shown. Enabling token 110 sends to drive 112 New Keys Available message 114. Message 114 may be a notification that new device keys are available or a demand that new device keys be received. In the first case, drive 112 makes decisions 116 to determine whether or not new device keys are needed. Drive 112 then sends Get Device Keys message 118 to enabling token 110. Enabling token 110 verifies message 118 and assembles the necessary one or more device keys, as in 120. This may involve encrypting the device keys. Enabling token 110 then sends Get Device Keys Response 122 to drive 112 which includes the requested device keys if message 118 verified correct. Drive 112 stores the requested device keys, as in 124, and generates status information, such as the success of storing the device keys. Drive 112 then sends Key Status Message 126 to enabling token 110.

Figure 5:
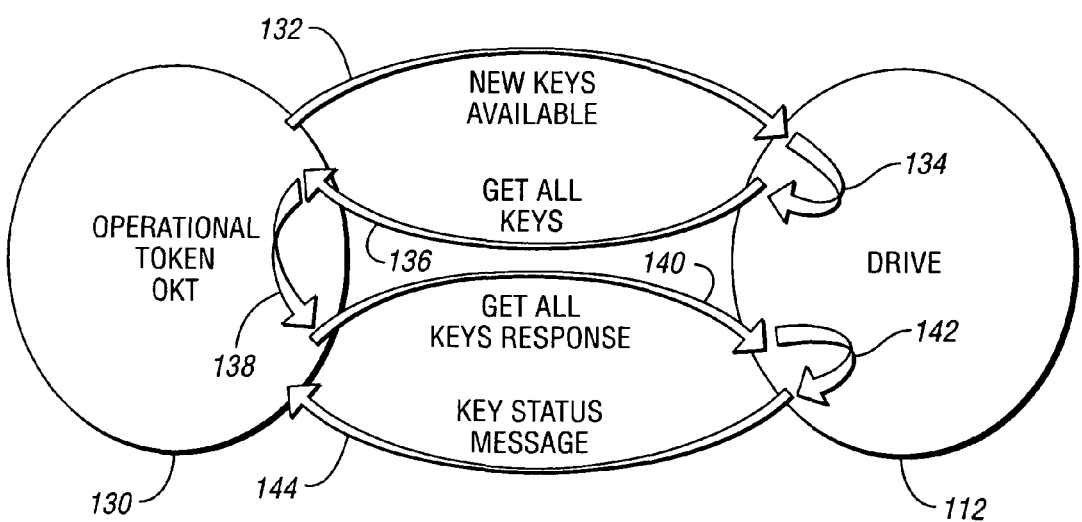
FIG. 5 is a flow diagram illustrating exchange between an operational token and a data storage device according to an embodiment of the present invention.

Referring now to FIG. 5, a flow diagram illustrating exchange between an operational token and a data storage device according to an embodiment of the present invention is shown. Operational token 130 sends to drive 112 New Keys Available message 132. Message 132 may be a notification that new media keys are available or a demand that new media keys be received. In the first case, drive 112 makes decisions 134 to determine whether or not new media keys are needed.

In either case, drive 112 sends Get All Keys message 136 to operational token 136. Operational token 130 verifies message 136 and assembles one or more media keys, as in 138. This may involve encrypting media keys by one or more device keys held within operational token 130. Operational token 130 then sends Get All Keys Response message 140, which will include the requested media keys if message 136 was successfully verified. Drive 112 decrypts the media keys using previously received device keys, stores the media keys in memory, and generates status information, as in 142. Drive 112 then sends Key Status Message 144 to operational token 130.

Figure 6:
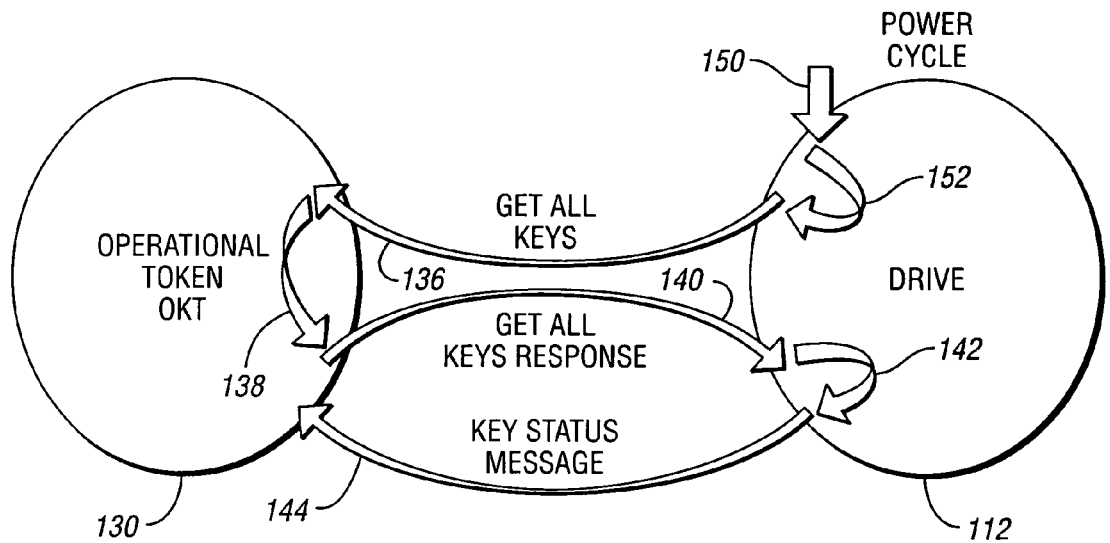
FIG. 6 is a flow diagram illustrating exchange between an operational token and a data storage device according to another embodiment of the present invention.

Referring now to FIG. 6, a flow diagram illustrating exchange between an operational token and a data storage device according to another embodiment of the present invention is shown. Media keys are generally held in volatile memory by drive 112. If power is lost, the media keys are erased. When power is restored, as in power cycle 150, drive 112 proceeds through a power-up routine, as in 152, which includes generating and sending Get All Keys message 136. Message 136 may include an indication that power cycle 150 has just occurred. Operational token 130 then sends one or more media keys as described above.

Figure 7:
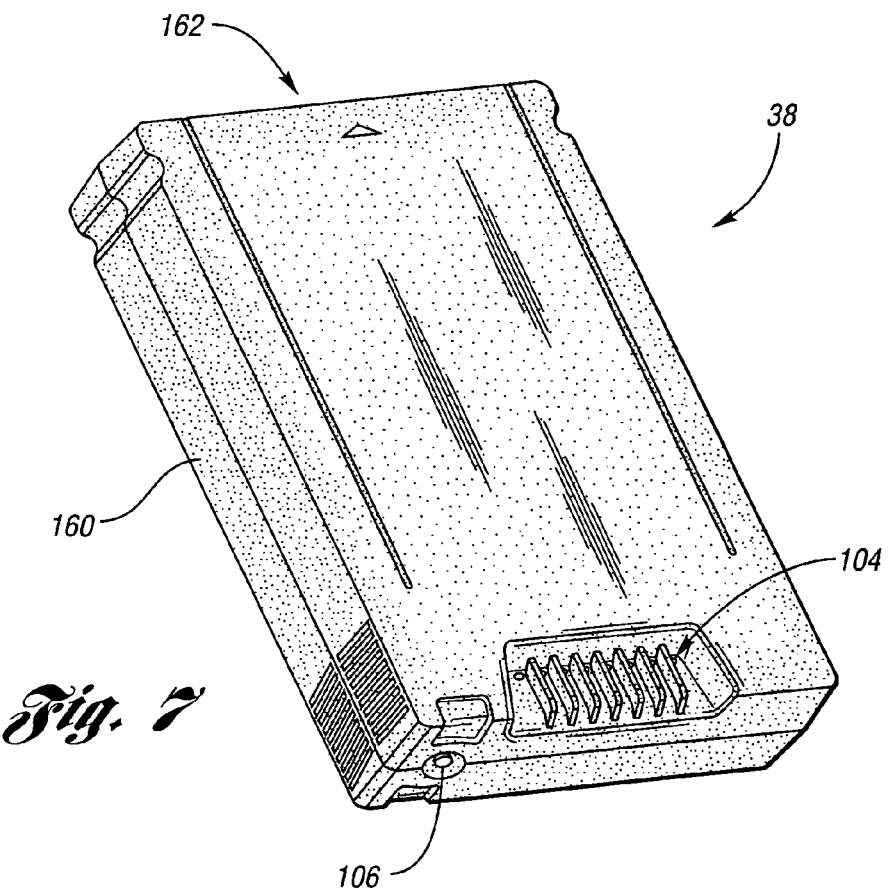
FIG. 7 is a perspective diagram illustrating a token according to an embodiment of the present invention.

Referring now to FIG. 7, a perspective diagram illustrating a token according to an embodiment of the present invention is shown. Token 38 includes a hard plastic shell 160. Indicators 104 and user input 106 are accessible from the outside of shell 160. User input 106 may be, a push button switch located within a recess in shell 160 to prevent accidental activation of user input 160. Token 38 may include blind-mating connector 162 providing at least part of one or more interfaces 94, 96, 98.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A hand-held, portable token for the secure conveyance of a media for use in encrypting data in a data storage device, the token comprising:
    a first memory operative to hold the media key, the media key having been previously encrypted using a first part of a device key;
    a second memory operative to hold a second part of the device key;
    a communication interface;
    control logic in communication with the first memory, the second memory, and the communication interface, the control logic operative to
    (a) read the media key from the first memory,
    (b) further encrypt the media key using the second part of the device key, and
    (c) transmit the further encrypted media key to the data storage device through the communication interface, the data storage device having stored therein the first and second parts of the device key for use in fully decrypting the media key; and
    a user input device, the control logic further operative to delete at least one of the media key and the second part of the device key in response to user activation of the user input device;
    wherein the token lacks the first part of the device key so that the media key cannot be fully decrypted using information stored in the token.

2. The token as in claim 1 wherein the first memory and the second memory are nonvolatile memory.

3. The token as in claim 1 further comprising a communication indicator, the control logic further operative to activate a communication indicator in response to communication activity through the communication interface.

4. The token as in claim 1 further comprising at least one status indicator, the control logic further operative to activate at least one status indicator in response to a change in status of the token.

5. The token as in claim 1 further comprising a thud memory, the control logic further operative to receive status information about the data storage device through the communication interface and store the received status information in the thud memory.

6. The token as in claim 1 wherein the control logic is operative to encrypt the at least one media key based on a nonce generated within the token.

7. The token as in claim 6 wherein the control logic changes the nonce after each time the at least one media key is encrypted such that the nonce value is unique each time the at least one media key is encrypted.

8. A method of securely transmitting a media key to a data storage device, the media key for use in encrypting data in the data storage device, the method comprising:
    loading a first device key stored in a first hand-held, portable token into the data storage device, the first device key comprising first and second parts for use in decrypting the media key;
    encrypting, at a key management station separate from the data storage device, the media key using a first part of a second device key, the second device key comprising first and second parts;
    storing the encrypted media key in a second hand-held, portable token;
    further encrypting, at the second token, the encrypted media key using the second part of the second device key;
    interconnecting the second token with the data storage device;
    transmitting the further encrypted media key from the second token to the data storage device; and
    decrypting the further encrypted media key in the data storage device using the first device key;
    wherein the second token lacks the first part of the second device key so that the media key cannot be fully decrypted using information stored in the second token, and wherein the second token comprises a user input device and deletes at least one of the media key and the second part of the second device key in response to user activation of the user input device.

9. The method of claim 8 wherein the first device key is a first copy of at least one symmetric encryption key and the second device key is a second copy of the at least one symmetric encryption key.

10. The method of claim 8 further comprising sending status information from the data storage device to the token.

11. A system for storing encrypted data on non-transitory data storage media comprising:
    as plurality of data storage devices, each data storage device operative to write encrypted data onto the data storage media, each data storage device operative to store is first device key for decrypting at least one media key used to encrypt the encrypted data the first device key comprising first and second parts;
    a first communication network interconnecting the plurality of data storage devices with at least one host computer, the first communication network for transmitting data between the at least one host computer and the plurality of data storage devices;

a second communication network interconnecting the plurality of data storage devices, the second communication network separate from the first communication network so as to interconnect the plurality of data storage devices independent of the first communication network;

a hand-held, portable token removably connectable to the second communication network, the token storing a second part of a second device key comprising first and second parts, the second device key corresponding to the first device key for at least one data storage device of the plurality of data storage devices, the token further storing a media key previously encrypted using the first part of the second device key, and the token operative to further encrypt the media key using the second part of the second device key and to transmit the further encrypted media key to the at least one data storage device, wherein the token comprises a user input device and is further operative to erase at least one of the second part of the second device key and the media key in response to use activation of the user input device;

wherein the token lacks the first part of the second device key so that the media key cannot be fully decrypted using information stored in the token, and wherein the at least one data storage device is operative to receive the first device key directly from another hand-held, portable token without using the second communication network.

12. The system for storing encrypted data on a data storage media as in claim 11 wherein the first device key is a first copy of at least one unique symmetrical key and the second device key is a second copy of the at least one unique symmetrical key.

13. The system for storing encrypted data on a data storage media as in claim 11 wherein the at least one data storage device is operative to erase the media key if power is removed from the at least one data storage device.

14. The system for storing encrypted data on a data storage media as in claim 11 wherein the at least one data storage device is operative, to send status information to the token through the second communication network.

* * * * *

UNITED STATES PATENT AND TRADEMARK OFFICE
CERTIFICATE OF CORRECTION

| | | |
|---|---|---|
| PATENT NO. | : 7,971,062 B1 | Page 1 of 1 |
| APPLICATION NO. | : 11/403109 | |
| DATED | : June 28, 2011 | |
| INVENTOR(S) | : James P. Hughes | |

It is certified that error appears in the above-identified patent and that said Letters Patent is hereby corrected as shown below:

In the Claims:

Column 7, Line 42, Claim 1:

After "of a media" insert -- key --.

Column 8, Line 11, Claim 5:

Delete "thud" and insert -- third --.

Column 8, Line 15, Claim 5:

Delete "thud" and insert -- third --.

Column 8, Line 63, Claim 11:

After "to store" delete "is" and insert -- at least one --.

Signed and Sealed this

Eighteenth Day of October, 2011

David J. Kappos
*Director of the United States Patent and Trademark Office*